United States Patent Office 3,537,655
Patented Nov. 3, 1970

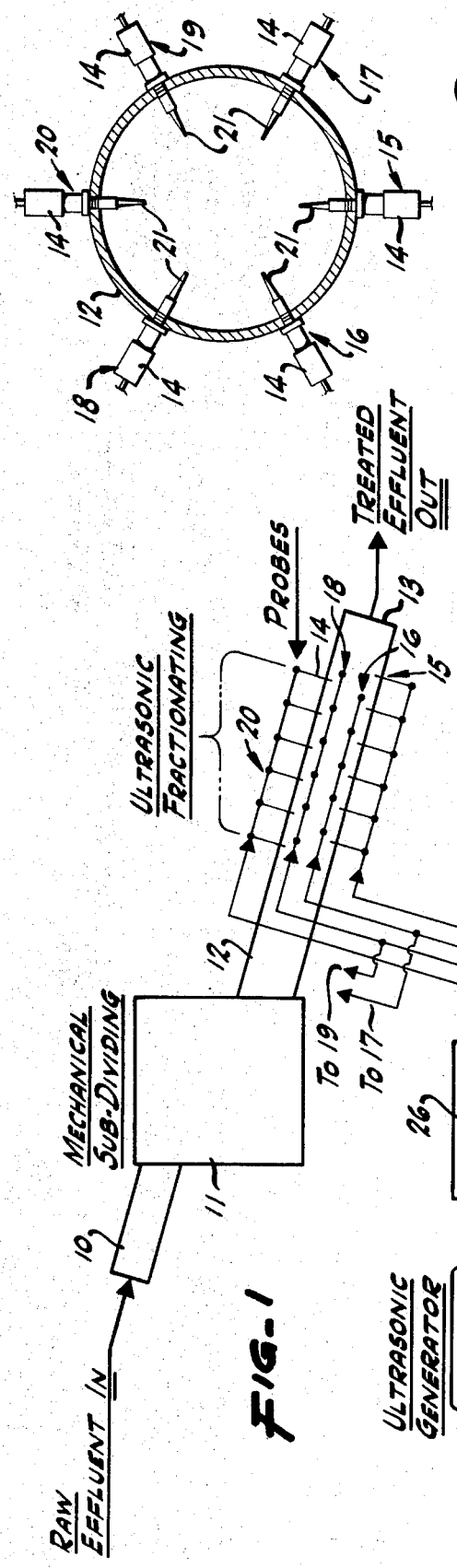

3,537,655
TREATMENT OF WASTE EFFLUENTS
Joel F. Gustafson, 35 Morningsun Ave.,
Mill Valley, Calif. 94941
Filed Apr. 18, 1968, Ser. No. 722,400
Int. Cl. B02c 19/00
U.S. Cl. 241—1                8 Claims

ABSTRACT OF THE DISCLOSURE

Method of treating sewage effluents and the like so as to at least partially sterilize the same and to facilitate decomposition thereof. The method includes the steps of subdividing the effluent by physical treatment thereof such as by means of mechanically grinding the same, and thereafter further fractionating and partially sterilizing the effluent by subjecting it to the action of ultrasonic vibratory energy.

---

This invention relates to a method of and apparatus for treating waste effluents such as sewage and the like, and it relates more particularly to an arrangement for subdividing or breaking up the solids within such effluent by physical processing thereof and of then further fractionating the solids by the application of ultrasonic vibratory energy to the effluent.

Most waste effluents such as sewage and the waste discharge from industrial processes are broken down by nature much more readily if the particle size of the solids comprised by such effluents is minute. In this respect, bacterial and fungal decomposition of such effluents as well as oxidation thereof and the action of sunlight are all significantly accelerated by direct exposure of the bacteria and wastes therein to these and other various cleansing agents of nature irrespective of whether the effluent contains organic or inorganic wastes. By way of example, coliform bacteria contained within grease particles and other sewage discharged into salt water may survive for one hundred hours or more in spite of the action on the sewage of the cleansing agents contained in the salt water, whereas such bacteria are generally destroyed within one to three hours whenever exposed directly or individually to the cleansing agents within a salt water environment. Evidently, the bacteria within such wastes are most nearly exposed directly whenever the particle size of the solids in the effluent is quite small.

Although most sewage processed by municipalities of any significant size is generally chlorinated or otherwise treated before being disposed of, as by discharge into a stream or river or other body of water, there are occasions when such conventional treatments are partially or completely by-passed and typical examples thereof include breakdown or other inoperation of the treatment facilities and overload thereof such as created by storm drainage into the disposal systems. Other examples of raw effluent discharge directly into bodies of water include the waste discharge from pleasure craft and other small boats, similar discharge from rural homes that may be located near a stream or river, and occasionally the waste from small municipalities and industrial concerns that may find conventional techniques for treatment too expensive.

In view of the foregoing, an object of the present invention is to provide an improved method of and apparatus for treating sewage and other waste effluents so as to at least partially sterilize the same and fractionate the solids comprised therein to facilitate decomposition thereof expecially by the cleansing agents and agencies of nature (e.g., sunlight, oxygen, salinity, phages, etc.). In the attainment of such object, the solids within such effluent, which may or may not have been subjected to a prior conventional treatment, are physically subdivided or broken up by mechanical processing thereof such as by passing the effluent through a grinder, and are thereafter subjected to ultrasonic vibratory energy sufficient in magnitude and in duration to at least partially sterilize the effluent and to further fractionate the solids therein to more directly expose the bacteria within the effluent to the cleansing agents of nature upon discharge of the effluent into a river or stream or other body of water.

Additional objects and advantages, especially as concerns specific features and characteristics, will become apparent from the following description of the exemplary embodiments of the invention shown in the accompanying drawing in which:

FIG. 1, is essentially a flow diagram illustrating one embodiment of the invention;

FIG. 2 is an enlarged transverse sectional view taken through the fractionating section of the flow conduit; and FIG. 3 is essentially a flow diagram illustrating a modified form of the invention.

The waste effluent to be treated is first mechanically processed to subdivide or break up substantially all of the solid material contained therein and thereby provide for subsequent processing a relatively uniform material as respects the maximum particle size thereof. Thereafter, the effluent is subjected to ultrasonic vibratory energy operative thereon to at least partially sterilize the same and further fractionate the solids. Evidently, the effluent could be processed on a batch-by-batch basis, but usually such handling thereof is inefficient and generally unacceptable because it is slow and requires the provision of rather large tanks and other receivers. Accordingly, the arrangements illustrated in the drawing depict continuous processing systems enabling the effluent to be treated as rapidly as it is produced.

The embodiment shown in FIG. 1 includes a pipe or conduit 10 through which the raw waste effluent flows to a first processing station defined by a subdivider mechanism 11 operative to break up or subdivide the effluent so that the solid matter therein for the most part does not exceed a maximum particle size. Any conventional mechanism 11 may be used as, for example, a shredder, chopper, hammer mill, or comparable structure effective to break up the material delivered thereto in order to reduce the same to a relatively small particle size. The subdividing mechanism 11 should have sufficient capacity and be of a type that can process a relatively high rate of flow and produce a subdivision of the solid materials to a size approximating those discharged from the conventional high speed disposal units used in the kitchen sinks of ordinary households or family dwellings. Also, since the effluent may contain sticks, paper, plastic, cloth and other similar materials, the mechanism 11 should be able to process the same.

Prior to the discharge of the effluent it is desirable to introduce massive quantities of air containing oxygen. This may be effected in a number of ways, such as by means of compressor pumps discharging air through a series of jets placed throughout the bottom of the outfall area. The oxygen supplied through this air introduction serves to lower the oxygen demand (biological oxygen demand or BOD) prior to discharge. The amount of oxygen introduced should be such as to reduce the BOD to no more than 4 parts per million in the receiving waters. Since the concept of introducing oxygen into waste and sewage effluents is known in the art and does not constitute any independent part of this invention, no further description or any showing in the drawings is deemed necessary.

The raw effluent delivered to the subdividing mechanism 11 through the conduit 10 may or may not have been subjected to prior steps of treatment depending upon the particular environmental setting for the apparatus. For example, if it is being used in association with the sewage disposal system of an industrial plant or municipality that customarily treats its waste effluent prior to discharge thereof, the described apparatus may be used in some cases as an alternative to such conventional treatment procedures and in other cases in addition thereto. In other environments there may be no provision for subjecting the effluent to a prior treatment, in which event the apparatus performs all of the treatment given to the waste effluent prior to discharge therefor. After passing through the mechanism 11, the effluent enters a conduit 12 from which it is eventually discharged at the outlet end 13 thereof into a receiver therefor which, in the usual case, will be a stream, river, lake or other body of water. Upon such discharge, the effluent will be decomposed in the usual manner by the chemical-mechanical-biological forces of nature which oxidize or otherwise convert the effluent into forms which are not ecologically destructive.

Prior to such discharge and after being subjected to the subdivision imparted thereto by the mechanism 11, the effluent is fractionated ultrasonically by being subjected to ultrasonic vibratory energy. Desirably, the effluent is also at least partially sterilized by the action thereon of such ultrasonic energy, and in order to effect sterilization, the effluent has such energy imparted thereto for a substantial time interval. The required interval of exposure is readily provided by having the energy imparted to the effluent along a predetermined length of the conduit 12 as the effluent moves therethrough at a flow rate of known velocity.

In this respect, in order to provide the desired time interval it is only necessary to know the simple relationships of flow velocity, flow volume, and exposure time in order to provide a definitive conduit length throughout which the effluent is to be subjected to the ultrasonic vibratory energy. More particularly, the flow quantity in volumetric measure per unit of time is equal to the cross-sectional area of the flow conduit multiplied by the flow velocity of the effluent (usually expressed by the formula $Q=AV$); and any particular distance through which a selected quantity of the effluent will flow is equal to the flow velocity thereof multiplied by time (usually expressed as $D=VT$). Evidently then, these relationships permit a definitive distance to be provided along the conduit 12 throughout which the effluent should be subjected to ultrasonic energy in order that it be exposed thereto for a time interval sufficient to sterilize the effluent to the extent desired.

In accordance with such distance determination, the conduit 12 intermediate the mechanism 11 and discharge end 13 is provided with probe structure comprising a plurality of energy probes 14 arranged in banks thereof, there being six such banks respectively denoted with the numerals 15, 16, 17, 18, 19 and 20. Each bank of probes extends longitudinally along the conduit 12, and the overall longitudinal distance defined by the banks of probes establishes the definitive distance throughout which the effluent is subjected to ultrasonic energy. The banks of probes are oriented with respect to the interior of the conduit 12 so as to cover the entire cross-sectional area thereof in the sense that substantially all of the effluent flowing through the conduit at any time will be subjected to ultrasonic energy. In this respect, each probe 14 extends through the outer wall of the conduit 12 and projects radially inwardly toward the center thereof, and each such probe may be threaded or otherwise secured in position in a manner preventing leakage of the effluent. As explained in somewhat greater detail hereinafter, each probe 14 has a tip 21 located within the interior of the conduit 12 and from which the ultrasonic vibratory energy is actually imparted to the effluent.

The probes 14 are energized by one or more ultrasonic generators 22 which may have an "on-off" or power switch 23, a probe switch 24, and a power output control knob 25 along the front panel thereof. Additionally, indicator lights, as shown, are usually included so as to provide visual indicia as to when the power and probe switches are in the "on" or operative positions thereof. The generator 22 is connected to the various banks of probes through a selector switch 26 which enables some or all of the banks or probes to be energized concurrently. More particularly, the conduit 12 is sized in cross-sectional area so as to be able to handle peak loads that are anticipated from time to time. Most frequently, however, much lesser quantities of the effluent flow through the conduit, and at certain hours of the day perhaps only a very small quantity of effluent moves through the conduit 12. During periods of small flow, significant power would be wasted if all of the banks of probes were energized, and the present invention obviates such waste.

More particularly, the banks of probes are arranged so that only those banks need by energized which are required to impart vibratory energy to the effluent flowing through the conduit at any particular time, and the switch 26 affords such control or selection. It will be observed, as shown in FIG. 1, that all of the probes 14 in any particular bank thereof are interconnected so that they are energized concurrently. Thus, and referring especially to FIG. 2, if only a small volume of effluent is flowing through the conduit 12, the selector switch 26 is adjusted so that only the probes 14 defining the bank 15 thereof are energized. As the level of the effluent in the conduit 12 rises, the banks 16 and 17 may be energized along with the bank 15, and as the effluent continues to rise farther, the banks 18 and 19 are next energized, and finally when the conduit is filled to capacity, the bank 20 of probes is also energized.

The mechanical subdivision of the effluent affected by the mechanism 11 might be considered to be a crude or gross subdivision thereof, and the further subdivision affected by the ultrasonic fractionating of the material at the second treatment station defined by the probes 14 might be taken to be a fine subdivision of the material. For the most part, the fine subdivided particles discharged from the outlet 13 are of macroscopic size which affords considerable surface area along which the bacteria and other organisms within the effluent are more directly exposed to the purification factors at work in the stream or other receiver into which the effluent is discharged.

A somewhat modified apparatus is illustrated in FIG. 3 and it departs from the apparatus heretofore considered only in the sense that the effluent is maintained at one general location as it is treated by application of ultrasonic vibratory energy thereto. Thus, instead of the banks of ultrasonic probes being extended in spaced-apart relation along a flow conduit, they are located at one general position or station defined by a retention tank or receptacle 27. Communicating with the tank 27 and defining the inlet thereto is a conduit 12a that carries the effluent after subdivision thereof by the mechanism 11 (not shown in FIG. 3) to the tank 27. The discharge from the tank 27 is, in effect, a continuation of the infeed conduit and it is denoted with the numeral 12b. The conduit 12b terminates in a discharge outlet 13a and the conduit (or the tank 27) may be equipped with a valve 28 to regulate the rate of discharge of the effluent from the tank.

Arranged with the tank 27 are a plurality of banks of probes which are selectively energized by an ultrasonic generator 22a through a selector switch 26a. The banks of probes are located at various elevations along the tank 27 and are selectively energized in accordance with the requirement to subject the effluent flowing therethrough to ultrasonic vibratory energy for a predetermined time interval. For identification, the banks of probes are respectively denoted with the numerals 15a, 16a, 17a, 18a, 19a, and 20a.

The size of each probe, the number thereof, and the power capacity of the ultrasonic generator (or generators as several may be used) will depend upon environmental requirements including the size of the flow conduit, or retention tank, and the flow rate of the effluent therethrough. The capacity of the subdividing mechanism 11 is also determined by such environmental factors and it should be observed that the mechanism may have one or more successive stages, and it may be arranged to provide various subdividing mechanisms arranged at different flow elevations so that only those mechanisms need be energized which are required at any particular time to process the level of effluent then flowing through the system.

The frequency at which the ultrasonic generator operates may be selected from a wide range extending into the megacycle band, but usually the lower frequencies are more desirable because the energy requirements therefor may be less, there is less fatigue on the equipment and especially the probes 14 thereof, and less heat is generated. As a specific example, frequencies of the order of 20,000 cycles per second have been found effective to both sterilize sewage effluent and to fractionate the same. As respects the length of time to which the effluent should be subjected in order to destroy certain bacteria therein, this depends to a considerable extent upon the precise bacteria for which destruction is intended. However, the spores of bacteria (including coliform bacteria) ordinarily found in sewage effluent is usually sterilized in a time of about two to four minutes. Certain bacteria in which the cell wall is coated with wax or wax-like substances may require as much as ten to fifteen minutes of exposure to ultrasonic energy before complete sterilization is evidenced, and to provide an indication of the time ranges considered adequate for typical substances, the following may be considered (referenced to a generator having a frequency of 20,000 cycles per second and a power of 125 watts, and a quantity of material sufficiently proximate the probe to receive the full power substantially undiminished):

*Bacillus subtilis*: 2–3 minutes
Blood cells: 3–4 seconds
Emulsions: less than 10 seconds
*Euglena gracilis*: 10–30 seconds
*Micrococcus lysodeikticus:* up to 15 minutes
*Penicillium notatum:* 2–4 minutes
*Staphylococcus aureus*: 10–15 minutes In certain instances it may be desirable to use energy reflectors in association with the various probes 14 so as to tend to localize or concentrate the energy emanating therefrom at a particular location. Also in this reference, the tips 21 of the probes 14 may have special shapes so as to provide an energy pattern emanating therefrom of particular form of configuration. Further, baffles may be used within the conduit 12 or within the tank 27 so as to influence the effluent in some desirable way as, for example, by directing it into close proximity with one or more of the probe tips or, perhaps, to agitate the effluent and thereby bring about a more intimate association with the probes.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. In a method of treating waste effluents and the like, the steps of mechanically subdividing such an effluent to restrict substantially all of the solid matter comprised therein to a predetermined maximum particle size, and then imparting ultrasonic vibratory energy to the effluent to further fractionate substantially all of the solid matter comprised therein and thereby reduce the average particle size thereof so that decomposition of the effluent by the forces of nature acting thereon is accelerated.

2. The method of claim 1 in which the step of imparting vibratory energy to such effluent is continued for a time sufficient to at least partially sterilize the same.

3. The method of claim 2 in which the step of imparting vibratory energy to such effluent is maintained continuously for a period of at least about two minutes.

4. The method of claim 3 in which the ultrasonic vibratory energy imparted to such effluent is maintained at a frequency of the order of 20,000 cycles per second.

5. The method of claim 1 including the further step of maintaining a continuous flow of such effluent during the step of imparting vibratory energy thereto.

6. The method of claim 1 including the further step of maintaining a continuous flow of such effluent during the step of mechanically subdividing the same.

7. The method of claim 6 including the further step of maintaining a continuous flow of such effluent during the step of imparting vibratory energy thereto.

8. The method of claim 7 in which the step of imparting vibratory energy to such effluent is continued for a time sufficient to at least partially sterilize the same.

References Cited

UNITED STATES PATENTS

| | | | |
|---|---|---|---|
| 2,468,515 | 4/1949 | Robinson. | |
| 2,798,673 | 7/1957 | Kunz et al. | 241—1 |
| 2,980,345 | 4/1961 | Kececioglu et al. | 241—1 |
| 3,062,457 | 11/1962 | Willems | 241—1 |

FRANK T. YOST, Primary Examiner

U.S. Cl. X.R.

210—152; 241—29